July 4, 1933.　　　　　A. E. BELLIS　　　　　1,916,407
RECUPERATIVE AND REGENERATIVE HEAT TREATMENT OF METALS
Filed Oct. 13, 1930　　　2 Sheets-Sheet 1
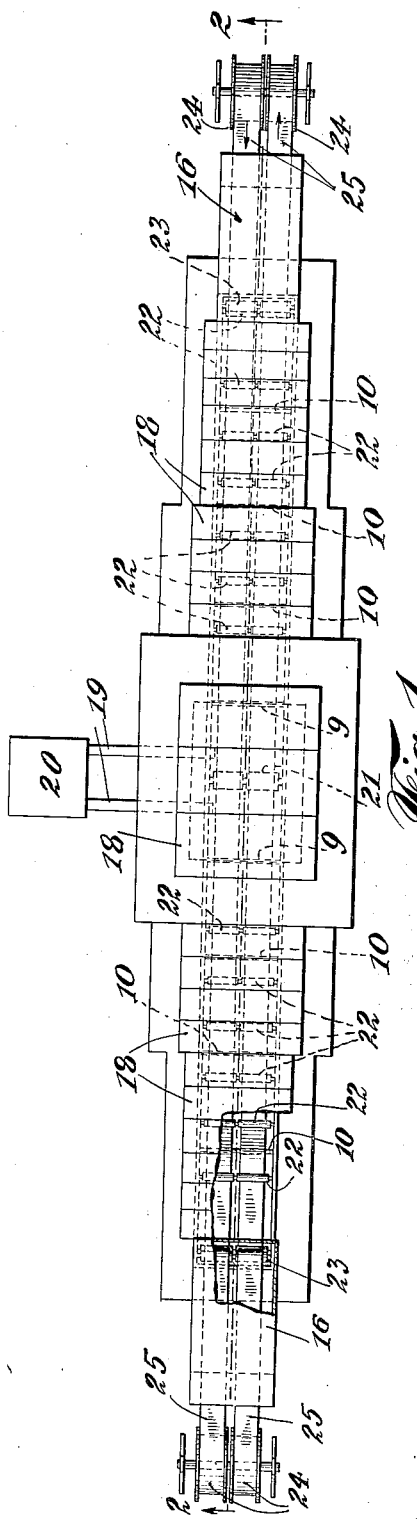
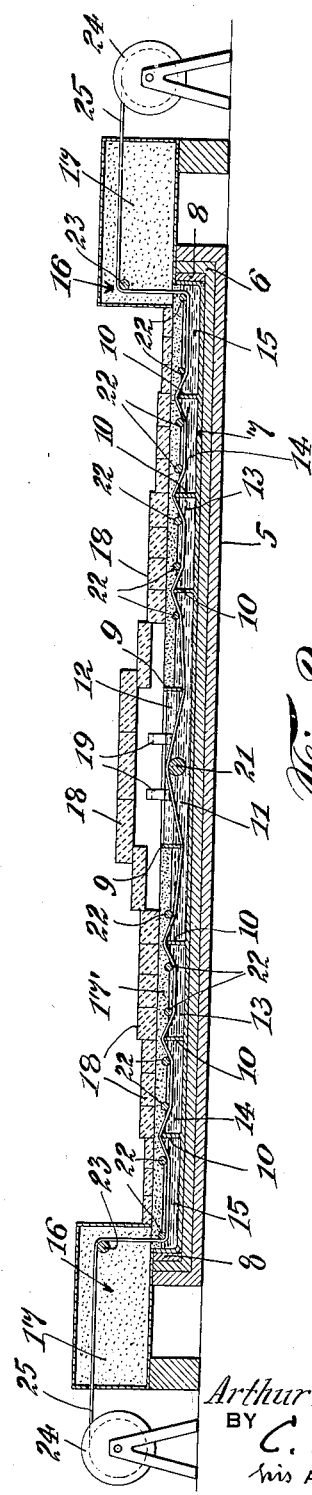
INVENTOR
*Arthur E. Bellis*
BY *C. P. Goepel*
his ATTORNEY

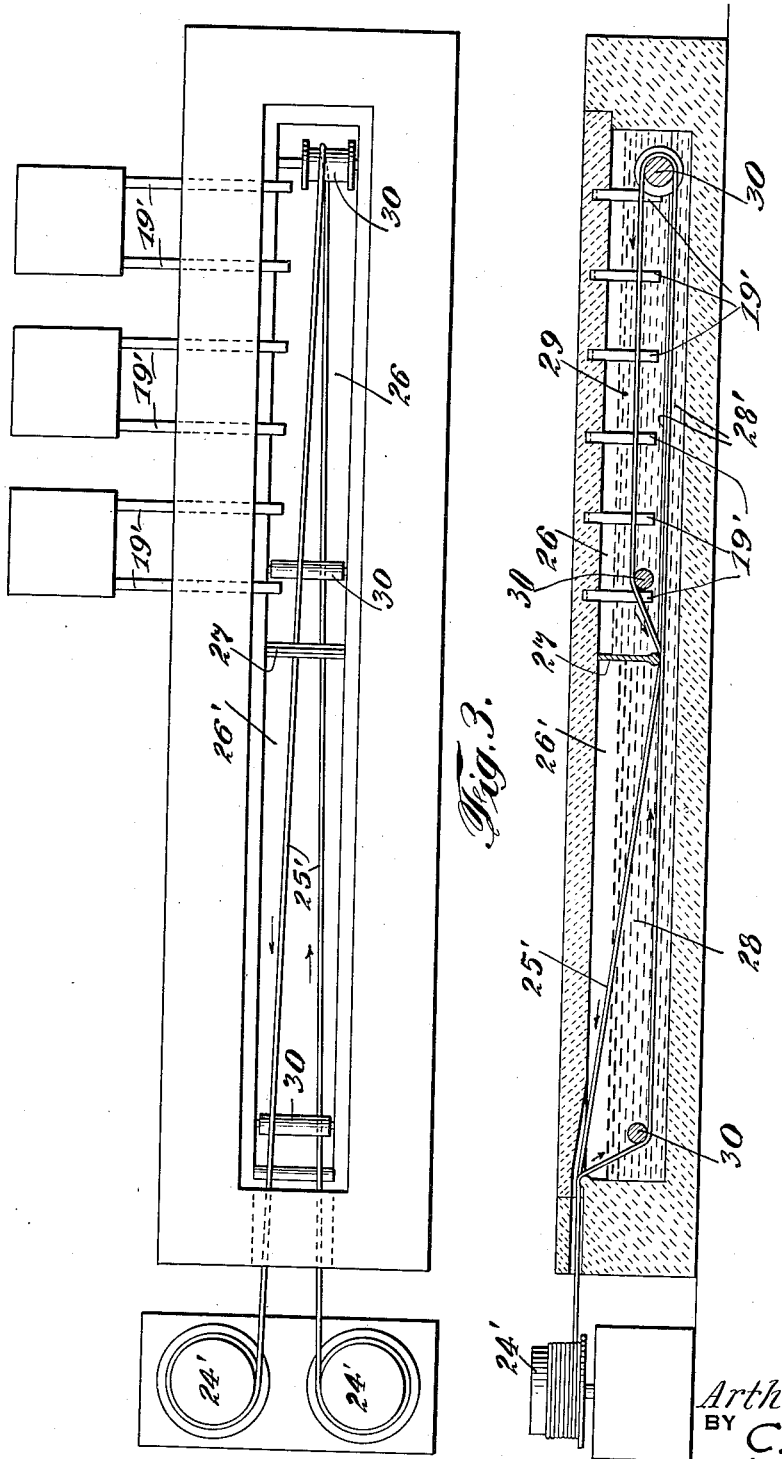

Patented July 4, 1933

1,916,407

UNITED STATES PATENT OFFICE

ARTHUR E. BELLIS, OF BRANFORD, CONNECTICUT

RECUPERATIVE AND REGENERATIVE HEAT TREATMENT OF METALS

Application filed October 13, 1930. Serial No. 488,263.

This invention relates to the recuperative and regenerative heat treatment of metals, and has for its general object and purpose to provide a new method whereby material economies may be realized in metal heat treating practice with large quantity production from each furnace unit and better metallurgical results than has heretofore been possible in the heat treatment of metals in accordance with prior art methods and processes.

It is a more particular object of my invention to provide such a method which is particularly intended for use in connection with electrically operated furnaces and which enables this form of heat to be employed with exact temperature control and with a very low current consumption so that the operating cost of such electrical heat treating furnaces will be reduced even below the operating cost of the fuel fired furnace.

To the above end, the invention is primarily characterized by the employment of certain liquid or semi-liquid heat transferring mediums in a single furnace installation maintained at relatively different temperatures and by means of which the metal is both heated to the critical transformation temperature and also quenched without exposure to the external atmosphere after entering the furnace. In practice, the metal being treated is moved into and out of the furnace simultaneously in relatively opposite directions successively through the several baths so that the heat of the treated metal after leaving the high temperature bath is absorbed by the baths of relatively lower temperature and transferred to the metal moving through said baths in the opposite direction so that the latter is preheated before entering the high temperature bath. Thus the method is both recuperative and regenerative whereby the power heat input to the furnace may be greatly reduced while maximum efficiency is obtained.

It is one of the important purposes of my present invention to provide a method which may be very advantageously employed in the annealing of metal strip by the continuous passage of the strip through the annealing furnace and which may be operated on a large quantity production basis without scratching, crinkling, discoloration or heat tinting of the strip and which will produce an annealed product of a higher quality than that which can be obtained in the operation of various methods of annealing as now practiced in the art.

With the above and other objects in view, the invention consists in the improved recuperative and regenerative method of heat treating metals as will be hereinafter more fully described, illustrated in the accompanying drawings, and subsequently incorporated in the subjoined claims.

In the drawings, wherein I have illustrated several types of furnaces which may be employed in carrying out the present method, and in which similar reference characters designate corresponding parts throughout the several views,—

Figure 1 is a top plan view partly broken away showing one form of electric furnace designed primarily for the annealing of metal strip;

Fig. 2 is a longitudinal section thereof, and

Figs. 3 and 4 are similar views illustrating another type of furnace.

In the large quantity production of heat treated metal, such as annealed wire or flat metal strip, electric furnaces have not heretofore been used to any great extent owing to the expense incident to the large consumption of electric current. In such a furnace, the power input is used principally for the purpose of heating the work from the entering temperature to the operating temperature, and secondly, to compensate for heat losses through the furnace walls and the door. Heretofore, the heat represented by the former item was carried out of the furnace by the work, while the heat represented by the latter item is simply wasted. Therefore, the heat input required to raise the temperature of the work is the useful output of the furnace and is definite and cannot be reduced. The efficiency of the furnace is therefore, usually referred to as the ratio of this useful heat in the work to the total heat input. One hundred percent efficiency in the operation of such a furnace would therefore, only be obtained, if there were no heat losses whatever through the furnace walls of the door and the door was never opened so that the total power input would be used for the purpose of heating the work.

The heat in the work is subsequently extracted or given off to the air or some other cooling medium in which the work is cooled or quenched. If some of this heat in the outgoing work could be transferred to the incoming work, it is obvious that the power input to the furnace could be considerably reduced, with a proportionate increase in operating efficiency. Certain spasmodic attempts to do this have been made by workers in the prior art by placing the incoming work in contact with the hot outgoing work in a heat insulated chamber of the furnace. Such attempts however, have been generally ineffective and unsuccessful principally owing to the inadequate heat transfer capacity of the heating medium for the work and insofar as I am aware, the prior art has never attempted to obtain such a transfer of heat from the hot outgoing work to the relatively cool incoming work by means of a liquid or semi-liquid heat transfer medium and without actual contact between the incoming and outgoing work and without exposure of the latter to an external oxidizing atmosphere.

It is the purpose of my present invention to accomplish this result in an electric furnace of relatively simply construction. In the furnace construction suggested in Figs. 1 and 2 of the drawings, the furnace body indicated at 5 may be of any suitable dimensions and constructed of fire brick or other materials. As shown, this furnace is relatively shallow and the walls thereof are internally provided with a suitable heat insulating lining indicated at 6. Within this lining, the shallow multi-chambered bath container 7 is arranged, said container being preferably of metal. Additional heat insulating means indicated at 8 is interposed between the opposite end walls of the container 7 and the lining 6, and preferably similar heat insulating means will be positioned between the side walls of the container and the corresponding walls of the lining 6, since it is essential that the outer walls of the container 7 shall be thoroughly insulated.

Centrally of the container 7, the opposite side walls thereof are connected by the spaced transverse webs indicated at 9 which extend downwardly from the upper edges of the side wall of the container to points spaced above the bottom wall thereof, thus providing a central chamber open at its opposite ends beneath the webs 9. At each side of this central chamber, the container is formed with a plurality of longitudinally spaced transverse webs 10 rising from the bottom wall thereof and terminating in spaced relation to the upper edges of the side walls of the said container. These webs thus provide a plurality of separate chambers at each side of the central chamber with the innermost chamber formed between the web 10 and one of the webs 9 in communication with said central chamber.

The central chamber of the container and the adjacent chambers in communication therewith are adapted to contain a bath of hot lead indicated at 11, the level of which is above the lower edges of the webs 9. Upon this hot lead bath and between said webs 9, a bath of chemical salts indicated at 12 is superimposed. In the chambers formed by the webs 10 at each side of the chamber containing the bath 11, a relatively cold lead bath 13 is contained, while in the next chambers adjacent to those containing the baths 13, metal alloy baths 14 are contained. In the end chambers of the container, baths of mercury 15 at relatively low temperature are contained.

At the opposite ends of the furnace and extending above the same, chambers 16 are provided and are in communication with the respective end chambers of the container 7 containing the mercury baths 15. These chambers are filled with powdered coke, charcoal or other carbonaceous material as indicated at 17, a layer of which material shown at 17' extends from said chambers to the webs 9 of the container 7 over the several liquid or semi-liquid baths 15, 14, 13 and 11.

The top of the furnace is closed by the removable refractory tile indicated at 18.

Any suitable electrical equipment may be provided for the purpose of heating the high temperature chemical salt bath 12, and for this purpose, in the drawings, I have indicated a plurality of heating electrodes 19 extending from the transformer 20 through suitable apertures provided in one side wall of the furnace and having their inner ends immersed in the bath 12.

In the central chamber of the container 7 a transverse guide roller 21 is suitably mounted, and similar guide rollers of relatively small diameter indicated at 22 are also mounted in the other bath containing chambers of the container, while a guide roller 23 is provided in each of the chambers 16. Externally of the furnace in spaced relation to each end thereof, a pair of metal strip reels 24 are mounted. The metal strip shown at 25 is withdrawn from one of the reels 24 at one end of the furnace through the several bath containing chambers and is wound upon one of the reels at the opposite end of the furnace, the two metal strips being thus moved simultaneously in relatively opposite directions around the guide rollers 23, 22 and 21 and through the several baths. These baths, successively increase in temperature from the relatively low temperature mercury bath at each end of the furnace to the high temperature salt bath 12 in the central furnace chamber. For the treatment of high carbon alloy or stainless steels, the latter bath is preferably of the composition disclosed in my Patent No. 1,724,352. It will however, be understood that this salt bath may be of various other compositions depending upon the working temperature required in accordance with the particular molecular structure desired in the heat treated metal. Each of the lead baths consists of substantially pure commercial lead while the alloy bath 14 preferably has a composition consisting of lead, 80 to 90%, tin 10 to 5% and cadmium 10 to 5%. I have found that such an alloy is a very good conductor of heat and gives up heat very rapidly to a metal immersed therein. The ratio of specific heats of this alloy and the salt material of the bath 12 are 0.032 to 0.21. Therefore, when the heated hot metal after passing through the salt bath 12, enters the alloy bath 14, the heat will be very rapidly extracted from the metal. Assuming that the work is heated in the salt bath 12 to 1570° F., and the alloy 14 has a melting point of 370° F., the net loss of heat would be only 370° times the specific heat and weight of the metal, as against 1500° times the specific heat and weight of the metal so that only one-fifth as much heat will be consumed as when such heat recovery does not take place. The recuperated or recovered heat absorbed by the alloy bath is transferred to the relatively cold metal entering the furnace through said bath whereby it is preheated before entering the high temperature salt bath 12.

Of course, the extent to which such economy in power consumption may be carried out is determined by the number of heating-cooling chambers employed. Assuming that the furnace is provided with as nearly perfect heat insulation for the several chambers thereof as is attainable and that the specific heat of the work passing therethrough is constant, in the example illustrated in Figs. 1 and 2 of the drawings, the power consumption would be reduced in accordance with the expression $$P = \frac{P_o}{N+1} = P_o \frac{1}{5+1} = \frac{P_o}{6}$$

where N is the number of regeneration chambers, P is the power consumption and $P_o$ is the heat content of the work at full temperature. Since the number of regeneration chambers is five the power saving is therefore, $$\frac{5}{6}.$$

Of course, perfect heat insulation is unattainable and therefore, the heat losses from a large number of regeneration chambers together with a decreasing gain in power economy from the larger numbers would probably make it inadvisable to use more than five regeneration chambers. This number however, would seem to be amply justified for all heat treating operations when the particular manner in which the work is cooled or quenched is not an essential consideration.

In order to realize approximately perfect heat transfer from the hot outgoing metal to the relatively cold incoming metal, it is necessary that each of the furnace chambers shall be maintained at a constant proper temperature. Heat loss from the high temperature chambers would be greater than from the chambers of lower temperature with corresponding greater reduction of temperature of the higher temperature chambers. It is therefore, necessary that the external walls of the heat regeneration chambers shall be very carefully insulated. The flow of heat through the dividing or separating walls between these chambers is not quite so serious, since the amount of heat which flows into a chamber through these separating walls at one side thereof is balanced by the outward flow of heat from the chamber through its opposite side wall so that the temperature level would not be affected.

It will be noted from reference to Fig. 2 of the drawings that the metal strips travelling through the furnace chambers in opposite directions are very closely related, thus facilitating the rapid transfer of heat. These metal strips upon entering the high temperature chamber, pass upwardly through the salt bath 12 over roller 21 from the lead bath 11, and then downwardly and again into and through the lead bath. The lead cleanly wipes off any adhering particles of the salt bath materials. The metal strips are then guided through the several heat regeneration chambers passing under the rollers 22 and over the separating walls or webs 10 between adjacent chambers, said strip as it passes over each web moving through the layer of carbonaceous material 17' which wipes off any adhering particles of the one bath material before the strip enters the next bath. In this manner, commingling of the different regenerative bath materials is prevented so that change in the different temperature levels in these baths from this cause is avoided.

In Figs. 3 and 4 of the drawings, I have shown an alternative form of the furnace in which a single metal strip is moved in reverse directions through the high and low temperature baths. In this case, the furnace is provided with the two chambers indicated at 26 and 26' which are separated from each other by the transverse barrier or wall 27 at their upper portions, said wall terminating in spaced relation to the base of the furnace so that at their lower ends the two chambers are in communication with each other. The chamber 26' contains the lead bath 28, a part of which also fills the lower portion of the chamber 26 above the lower edge of the wall 27 as indicated at 28', there being superimposed upon this portion of the lead bath the high temperature bath of salt materials indicated at 29. The electrodes indicated at 19' extend into the latter bath as in the furnace previously described and suitably arranged rollers 30 are mounted in the furnace chambers for guiding the metal strip or wire 25'.

At one end of the furnace exterior thereto, the spaced reels 24' are arranged, and the wire or strip 25' is unwound from one of these reels and first passes into the furnace chamber 26' and through the lead bath 28, the strip moving substantially parallel with the base wall of the furnace beneath the transverse wall 27 and through the portion 28' of the lead bath so that it is properly preheated before passing upwardly around the guide roller 30 at one end of the furnace and into the high temperature bath 29. After passing through this high temperature bath, the wire or strip is then again passed beneath the wall 27 and through the lead bath 28 in chamber 26' where the greater part of the heat is abstracted from the metal strip before it leaves the latter furnace chamber and is wound upon the other of the reels 24'. This type of furnace is preferably used in heat treating stainless steel, or strip of very thin cross section.

While the present invention is applicable to various heat treatments of different kinds of metals, it has been found particularly practical in the annealing of metal strip or wire in view of my discovery, that owing to the development of the high temperature metal salt bath which gives exactly its own temperature to the metal being treated, it is no longer necessary to retard or slow down the cooling phase of the annealing cycle as heretofore taught by the prior art. An annealed metal of superior quality may be obtained with relatively rapid cooling of the metal after it has been heated to the annealing temperature. This radical departure in the annealing of metals is fully disclosed in my pending application Serial No. 640,076, and therefore, is not broadly claimed herein. It will, of course, be understood that in annealing, as well as in the various other heat treatments of different metals to which my present invention may be applied, the length and volume of the several liquid or semi-liquid baths must be carefully predetermined in accordance with the particular heat treatment to be carried out, and the molecular structure of the particular metal being treated. Since various different kinds of metal salt baths having different ranges of working temperatures for use in hardening, tempering, annealing, etc., which have been developed by me are now in more or less general use in the art, specific reference thereto is unnecessary. In the normalizing of low carbon steel and in the heat treatment of stainless steel unusually high temperatures are required, and by means of my present invention an unusual economy may be effected in these heat treatments in an electric furnace. Thus, the metal may be heated to the transformation temperature of 2170° F., and cooled down or quenched to 370° F., before leaving the furnace so that the heat loss is only one-seventh of that which results from the usual water quenching practice. Comparative tests have disclosed that the new furnace and method as herein described produces much better metallurgical results than have heretofore been possible, as indicated by deeper Olson cupping tests, elongation tests, and ductility tests for equivalent Rockwell readings. These improved results are accomplished with appreciably greater economy in power consumption and in quantity production of the treated metal than could be obtained in the use of methods and furnaces previously employed in the art.

It is to be particularly noted that as the metal treated in accordance with my new method is reduced from the high transformation temperature to the quenched temperature without atmospheric contact, scaling of the metal is impossible. It has heretofore been attempted in the use of electrically heated furnaces to provide a hydrogen atmosphere for preventing such scaling of stainless steel strip. In this case however, the strip was quenched in water, and it was found that the hydrogen gases seriously discolored the metal strip. The deficiencies of this prior art method are entirely overcome by the present invention wherein the strip is quenched in lead or a low melting alloy after passing from the high temperature bath.

From the foregoing description considered in connection with the accompanying drawings, the new method of heat treating metals and the several advantages resulting therefrom will be clearly understood. While I have herein referred to several examples of furnace structures which I have found to be very satisfactory in carrying out my new method, it is apparent that this method might also be practiced in connection with furnaces of various other constructions. Accordingly, it is to be understood that the privilege is reserved of resorting to all such variations in the furnace structure as may be found desirable to meet the exigencies of the particular installation or industrial requirements. Also, the novel features of my new method are to be limited or restricted in their application, only as required by the prior art, and the appended claims.

I claim:

1. A method of heat treating metal wire or strip material which consists in continuously moving the material through a preheating and heat absorbing liquid bath directly into and through a relatively high temperature liquid bath superimposed upon a part of said preheating bath and directly from the latter into and through the said preheating and heat absorbing bath, whereby heat is absorbed by the material from the latter bath to maintain said preheating and heat absorbing bath at a substantially constant temperature relative to the high temperature bath.

2. A method of heat treating metal strip which consists in providing a central bath of molten lead, and a relatively high temperature salt bath superimposed upon the central portion of said lead bath, together with a series of quenching baths of liquid materials at each side of said lead bath and of successively decreasing temperatures, and then moving the metal strip continuously in reverse directions through the two series of quenching baths, the lead bath and the high temperature salt bath without exposure to the external atmosphere, whereby the metal strip entering the salt bath is preheated by the heat absorbed by the quenching baths from the outgoing strip, and said quenching baths are thereby maintained at substantially constant predetermined temperatures.

In testimony that I claim the foregoing as my invention, I have signed my name hereto.

ARTHUR E. BELLIS.